United States Patent
Bergqvist et al.

(10) Patent No.: US 11,900,731 B2
(45) Date of Patent: Feb. 13, 2024

(54) BIOMETRICS IMAGING DEVICE AND BIOMETRICS IMAGING METHOD FOR CAPTURING IMAGE DATA OF A BODY PART OF A PERSON WHICH ENABLE IMPROVED IMAGE DATA QUALITY

(71) Applicant: QAMCOM INNOVATION LABS AB, Gothenburg (SE)

(72) Inventors: Johan Bergqvist, Zug (CH); Arnold Herp, Moehrendorf (DE)

(73) Assignee: QAMCOM INNOVATION LABS AB, Gothenburg (SE)

( * ) Notice: Subject to any disclaimer, the term of this patent is extended or adjusted under 35 U.S.C. 154(b) by 118 days.

(21) Appl. No.: 17/602,464

(22) PCT Filed: Apr. 6, 2020

(86) PCT No.: PCT/EP2020/059718
§ 371 (c)(1),
(2) Date: Oct. 8, 2021

(87) PCT Pub. No.: WO2020/207947
PCT Pub. Date: Oct. 15, 2020

(65) Prior Publication Data
US 2022/0207922 A1   Jun. 30, 2022

(30) Foreign Application Priority Data
Apr. 10, 2019   (CH) .................................... 00486/19

(51) Int. Cl.
*G06V 40/10* (2022.01)
*G06V 40/60* (2022.01)
*G06V 10/143* (2022.01)

(52) U.S. Cl.
CPC ............ *G06V 40/67* (2022.01); *G06V 10/143* (2022.01); *G06V 40/11* (2022.01)

(58) Field of Classification Search
CPC ....... G06V 40/67; G06V 40/11; G06V 10/143
See application file for complete search history.

(56) References Cited

U.S. PATENT DOCUMENTS 11,410,458 B2 *   8/2022   Zhou ................... G06V 10/143
2005/0286744 A1   12/2005   Yoshizu
(Continued)

FOREIGN PATENT DOCUMENTS

| EP | 1 903 509 A1 | 3/2008 | |
| EP | 2 506 188 A2 | 10/2012 | |
| WO | WO-2015127313 A1 * | 8/2015 | ......... G06K 9/00604 |

OTHER PUBLICATIONS

R. K. Rowe, U. Uludag, M. Demirkus, S. Parthasaradhi and A. K. Jain, "A Multispectral Whole-Hand Biometric Authentication System," 2007 Biometrics Symposium, USA (Year: 2007).*
(Continued)

*Primary Examiner* — Shaghayegh Azima
(74) *Attorney, Agent, or Firm* — Paul D. Bianco; Fleit Intellectual Property Law

(57) ABSTRACT

A biometrics imaging device for capturing image data of a body part of a person comprises a visible light sensor for capturing image data of the body part in the visible light spectrum and/or a near infrared light sensor for capturing image data of the body part in the near infrared light spectrum. The biometrics imaging device comprises a time of flight camera for capturing three dimensional image data of the body part. The biometrics imaging device executes a procedure which includes: capturing three dimensional image data of a current body part posture; determining based of the image data a difference between a desired body part posture and the current body part posture; providing based on the determined difference user guidance to enable the person to adapt the body part posture in direction of the
(Continued)

desired posture; and capturing image data in the visible light spectrum and/or image data in the infrared light spectrum.

15 Claims, 7 Drawing Sheets

(56) References Cited

U.S. PATENT DOCUMENTS

| | | | |
|---|---|---|---|
| 2006/0018523 A1 | 1/2006 | Saitoh | |
| 2006/0023919 A1 | 2/2006 | Okamura | |
| 2014/0133710 A1* | 5/2014 | Hama | G06F 21/32 |
| | | | 382/115 |
| 2014/0369558 A1* | 12/2014 | Holz | G06T 7/586 |
| | | | 382/103 |
| 2016/0162020 A1* | 6/2016 | Lehman | G06F 3/017 |
| | | | 715/835 |
| 2022/0172505 A1 | 6/2022 | Bergqvist | |

OTHER PUBLICATIONS

K. Chen and D. Zhang, "Band Selection for Improvement of Dorsal Hand Recognition," 2011 International Conference on Hand-Based Biometrics, Hong Kong, China (Year: 2011).*

J. Svoboda et al.; "Contactless biometric hand geometry recognition using a low-cost 3D camera," 2015 International Conference on Biometrics (ICB); (Year: 2015).*

Javier Molina et al.; "Real-time user independent hand gesture recognition from time-of-flight camera video using static and dynamic models"; Springer, (Year: 2011).*

Jane You, "On Hierarchical Palmprint Coding With Multiple Features for Personal Identification in Large Databases", vol. 14, Feb. 2004, 10 pages, IEEE.

International Search Report (dated Jun. 12, 2020) and Written Opinion for PCT/EP2020/059718, filed Apr. 6, 2020.

Svoboda et al, "Contactless biometric hand geometry recognition using a low-cost 3D camera", 2015 International Conference on Biometrics (ICB), IEEE, May 19, 2015, pp. 452-457.

Samoil et al, "Multispectral Hand Biometrics", 2014 Fifth International Conference on Emerging Security Technologies, IEEE, Sep. 10, 2014, pp. 24-29.

International Search Report dated May 4, 2020 for PCT/EP2020/059714, filed Apr. 6, 2020.

Written Opinion for PCT/EP2020/059714, filed Apr. 6, 2020.

International Preliminary Report on Patentability dated Sep. 28, 2021 and Written Opinion for PCT/EP2020/059718, filed Apr. 6, 2020 (English translation).

International Preliminary Report on Patentability dated Sep. 28, 2021 and Written Opinion for PCT/EP2020/059714, filed Apr. 6, 2020 (English translation).

Teledyne E2V, Time of Flight—3D Imaging, May 29, 2018 (14 pages), XP93058034A.

EPO Office Action for EP Application 20717828.6 (national stage of WO2020EP59718) dated Jun. 30, 2023 (5 pages).

* cited by examiner

BIOMETRICS IMAGING DEVICE AND BIOMETRICS IMAGING METHOD FOR CAPTURING IMAGE DATA OF A BODY PART OF A PERSON WHICH ENABLE IMPROVED IMAGE DATA QUALITY

TECHNICAL FIELD

The present disclosure relates to a biometrics imaging device and a biometrics imaging method for capturing image data of a body part of a person. In particular, the present disclosure relates to a biometrics imaging device and a biometrics imaging method for capturing image data of a body part of a person which enable improved image data quality.

PRIOR ART

Biometric authentication devices, which include biometric imaging devices for capturing image data of a body part of a person, are widely used for the authentication of persons, such as in the context of access control to resources as for example buildings, rooms, computers, smartphones, electronic bank accounts, voting systems, school or university exam papers, frontiers, company registers, etc.

In some embodiments, biometrics imaging devices are configured to capture image data of a body part of a person, such as of a hand of the person, such that individual and typical biometric features may be determined from the captured image data. Captured image data of the hand or body part of the person may relate to image data captured with a near infrared light sensor (e.g. 700 nm to 900 nm), to image data captured with a visible light sensor (e.g. 400 nm to 600 nm), or a combination thereof. Biometric features determined from image data may relate to vein patterns, palm prints, lifelines, etc. of the hand. Image data captured in the near infrared light enable determining features relating to vein patterns of the hand. Image data captured in the visible light enable determining features relating to palm prints and lifelines of the hand.

Authentication of persons is based on pre-stored biometric features which were registered under control of an entitled and trustworthy authority. This authority verifies the identity of a person on the basis of an identification card such as passport, for example. Respective image data of the hand of the person is captured and biometric features of the hand or body part of the person are determined from the captured image data. The determined biometric features are stored in a database as pre-stored biometric features. In some embodiments, the pre-stored biometric features may include partially or fully the captured image data. The determined biometric features of the hand or body part, the captured image data of the hand, or a combination thereof, may relate to vein patterns, palm prints, lifelines, etc.

Later on, in case the authentication of a person is required, a biometric authentication device captures image data of the hand or body part of the person. Biometric features of the hand or body part of the person are determined and compared with pre-stored biometric features and/or pre-stored image data. Authentication is approved for the person if a match is found within the pre-stored biometric features, otherwise authentication is rejected.

In order to achieve reproducible results and sufficient authentication accuracy, the biometrics imaging device must capture image data of the body part or hand of the person with high quality, both as regards the visible light spectrum and the near infrared light spectrum. In particular, illumination with visible light and near infrared light is required to have a high homogeneity and uniform intensity. Capturing image data of body parts of persons is required to provide high quality image data in various environmental conditions. For example, in retrofit installations, previously installed lighting may not be optimally designed for the installation of biometrics imaging devices. In order to achieve a desired ease of use, biometric imaging devices are often installed such that the person may move the body part into a comfortable posture. For example, the person may desire to move the flat hand into a horizontal posture with regard to the floor, or into a posture having an inclination of maximally 45° with regard to the floor. However, backlight may severely impact quality of image data captured with biometric imaging devices which have been installed to provide a desired level of ease of use. Other applications of biometrics imaging devices relate to laptop computers or smartphones, which are used in daylight, sun, rainy conditions, during the night, etc. However, it is required that captured image data is of high quality also under such heavily varying environmental conditions. In case biometric features from the whole hand and the fingers need to be determined, it becomes particularly difficult to capture image data of high quality because there is no coverage of backlight as in the case when biometric features relating only to a sub-region of the palm of the hand need to be determined. An important quality feature of captured image data relates to the so called "regions of interest", which must be clearly identified. This results in the requirement that the image data must have a high contrast at the edges of the hand in order to determine the outline of the hand unambiguous and reproducible.

US2005286744A1 discloses capturing images of a palm. A front face guide is provided for supporting a wrist. The front face guide enables guiding the palm naturally to an image capturing region of the sensor unit. The palm can be correctly positioned.

US2006023919A1 discloses providing guidance such that image capture of biometrics information is performed appropriately. An image capture device is caused to perform a plurality of image capture operations (including distance measurement) at short intervals. A guidance screen is displayed according to analysis results. Guidance includes messages "Please place your hand over the authentication device again", "Your hand is too far away", "Spread palm", "Please left hand parallel to device". Guidance is disclosed in connection with a mechanical guide.

SUMMARY OF THE INVENTION

One aspect of the invention relates to a biometrics imaging device and a biometrics imaging method which do not have at least some of the disadvantages of the prior art. In particular, one aspect of the invention relates to a biometrics imaging device and a biometrics imaging method which enable improved image data quality. In particular, one aspect of the invention relates to a biometrics imaging device and a biometrics imaging method which enable improved image data quality under difficult backlight conditions and without any mechanical auxiliary devices such as a mechanical hand guidance.

According, a biometrics imaging device and a biometrics imaging method are disclosed herein. Additionally, various embodiments of the invention are disclosed.

In one embodiment, a biometrics imaging device for capturing image data of a body part of a person comprises at least one of a visible light sensor for capturing image data of the body part in the visible light spectrum and a near infrared light sensor for capturing image data of the body part in the near infrared light spectrum. The biometrics imaging device comprises a time of flight camera configured for capturing three dimensional image data of the body part of the person. The biometrics imaging device is configured to execute an imaging procedure which includes the steps of: capturing three dimensional image data of a current body part posture; determining on the basis of the three dimensional image data a difference between a desired body part posture and the current body part posture; providing on the basis of the determined difference user guidance to the person enabling the person to adapt the body part posture in direction of the desired posture; and capturing at least one of image data in the visible light spectrum and image data in the infrared light spectrum. The desired body part posture may take into account difficult backlight conditions. The desired body part posture may be determined dynamically, for example in accordance to captured three dimensional image data. The desired body part posture may take into account particular factors such as the location of light sources, the brightness of light sources, etc. Without the need of further aids such as a mechanical guide, the user is enabled to adapt the body part posture in accordance to the desired body part posture and quality of captured image data is improved.

Capturing image data in the visible light spectrum and/or capturing image data in the near infrared spectrum may be optimized on the basis of three dimensional image data captured by the time of flight camera. For example, optimization may relate to focal length and/or depth of field of the visible light sensor. For example, optimization may relate to focal length and/or depth of field of the near infrared light sensor. For example, in case of capturing image data of a palm side or back side of a hand, optimization may enable that wrinkles or skin folds may be captured with detailed resolution, for example complementing the lifelines of the palm side of the hand with further details. Optimization on the basis of three dimensional image data may relate to determining a desired body part posture having a predefined distance from the visible light sensor and/or near infrared light sensor, thereby taking into account focal length and/or depth of field. Accordingly, no expensive lenses such as sufficiently fast electrically adaptable liquid lenses are required. Furthermore, no real-time computationally complex frequency analysis of the image data in the visible light or near infrared light spectrum is required. Moreover, three dimensional image data captured by the time of flight camera enables measuring precisely the absolute dimensions of the body part, such as a hand.

In an embodiment, the current and desired body part posture relate to one or more of a relative distance, a relative orientation, and a gesture. In some embodiments, relative distance and/or relative orientation are defined with respect to the visible light sensor and/or with respect to the near infrared light sensor.

In an embodiment, user guidance relates to one or more of adapting a relative distance, a relative orientation, and a gesture of the current body part posture. The relative distance may relate to the distance between the biometrics imaging device and the body part. The relative orientation may relate to the relative orientation between the biometrics imaging device and the body part posture. The relative distance and/or orientation may depend on properties of the environment of the biometrics imaging device, such as backlight, reflecting surfaces, etc. The gesture may relate to movements of the body part such as the stretching of spreading of fingers of a hand.

In an embodiment, user guidance includes one or more of a visual guidance displayed on a display and acoustic guidance played back on a loudspeaker. Acoustic guidance may be less preferable because the language of the person may not be known. Acoustic guidance may include generic signals such as warning signals, information signals, etc. Visual guidance may include representations of the body part, which may include accentuations such as coloured parts.

In an embodiment, user guidance includes displaying on a display a representation of the desired body part posture and a representation of the current body part posture. The person is enabled to adapt the body part posture more precisely.

In an embodiment, user guidance includes displaying on a display a representation of a spirit level indicating the difference between the current body part posture and the desired body part posture. The person is enabled to adapt the body part posture more precisely.

In an embodiment, the biometrics imaging device is further configured to repeat one or more steps of the imaging procedure more than once. The person is enabled to adapt the body part stepwise, thereby increasing precision.

In an embodiment, the biometrics imaging device is further configured that in case the determined difference is within the predefined range a delay of less than 100 milliseconds, preferably less than 10 milliseconds, is maintained between determining the difference and capturing at least one of image data in the visible spectrum and image data in the infrared spectrum. Image data relevant for biometrics features is captured as soon as the body part posture is in the desired posture.

In an embodiment, the biometrics imaging device is further configured to determine a region of interest of the body part on the basis of at least one of three dimensional image data, image data in the visible light spectrum and image data in the near infrared light spectrum, and to adapt in accordance to the region of interest at least one of the desired body part posture and capturing at least one of image data in the visible light spectrum and image data in the infrared light spectrum. For example, the near infrared light spectrum may not include a vein pattern in case of a palm of a hand of a woman and in this case the desired posture may be changed to the back of the hand of the woman. For example, a rectangular region of interest of a part of the palm of a hand may not include sufficient biometric features and in this case the desired body part posture and/or capturing image data may be changed to enable capturing image data of a larger area of the palm of the hand, for example also including all the fingers.

In one embodiment, a biometrics imaging method captures image data of a body part of a person, wherein at least one of a visible light sensor for capturing image data of the body part in the visible light spectrum and a near infrared light sensor for capturing image data of the body part in the near infrared light spectrum. The method comprises: providing a time of flight camera configured for capturing three dimensional image data of the body part of the person; and executing an imaging procedure which includes the steps of: capturing three dimensional image data of a current body part posture; determining on the basis of the three dimensional image data a difference between a desired body part posture and the current body part posture; providing on the basis of the determined difference user guidance to the person enabling the person to adapt the body part posture in direction of the desired posture; and capturing at least one of image data in the visible light spectrum and image data in the infrared light spectrum.

In an embodiment, user guidance relates to one or more of adapting a relative distance, a relative orientation, and a gesture of the current body part posture.

In an embodiment, user guidance includes displaying on a display a representation of the desired body part posture and a representation of the current body part posture.

In an embodiment, the biometrics imaging method further comprises: repeating one or more steps of the imaging procedure more than once.

In an embodiment, the biometrics imaging method further comprises maintaining in case the determined difference is within the predefined range a delay of less than 100 milliseconds, preferably less than 10 milliseconds, between determining the difference and capturing at least one of image data in the visible spectrum and image data in the infrared spectrum.

In an embodiment, the biometrics imaging method further comprises determining a region of interest of the body part on the basis of at least one of three dimensional image data, image data in the visible light spectrum and image data in the near infrared light spectrum, and adapting in accordance to the region of interest at least one of the desired body part posture and capturing at least one of image data in the visible light spectrum and image data in the infrared light spectrum.

BRIEF EXPLANATION OF THE FIGURES

The invention is described in greater detail below with reference to embodiments that are illustrated in the figures. The figures show.

EMBODIMENTS OF THE INVENTION

Figure 1:
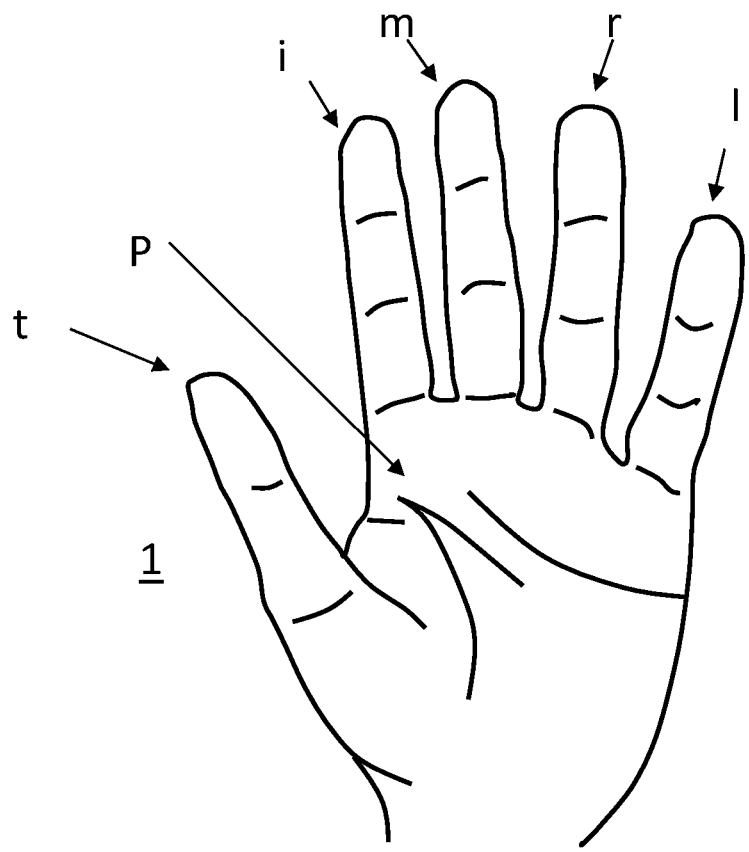
FIG. 1 illustrates schematically the palm of the left hand of a first person.
Figure 2:
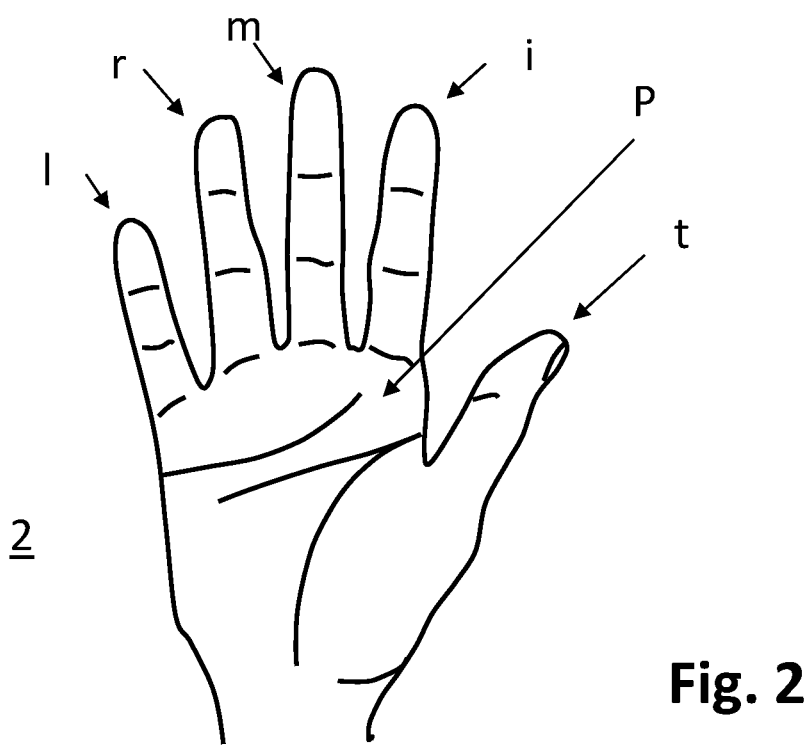
FIG. 2 illustrates schematically the palm of the right hand of a second person.

FIG. 1 illustrates schematically the palm of the left hand 1 of a first person. The left hand 1 has a thumb t, an index finger i, a middle finger m, a ring finger r, and a little finger l. FIG. 2 illustrates schematically the palm of the right hand 2 of a second person. The right hand 2 has a thumb t, an index finger i, a middle finger m, a ring finger r, and a little finger l.

FIG. 1 and FIG. 2 illustrate schematically images of the palms of the left and the right hand 1, 2 captured with a visible light sensor (e.g. 400 nm to 600 nm). The hands 1, 2 have palm prints P or lifelines, which can be identified in visible light. Additionally or alternatively, vein patterns of the hands 1, 2 can be determined from image data captured in near infrared light (e.g. 700 nm to 900 nm). FIG. 1 and FIG. 2 do not illustrated vein patterns.

As is illustrated in FIG. 1 and FIG. 2, the palm prints P or lifelines of the hands 1, 2 of these two persons include individual biometric features, such as particular lengths, positions, curvatures, etc. By comparison with biometric features which have been pre-stored from body parts of registered persons, authentication of a particular person is enabled, in particular in combination with biometric features determined from respective vein patterns. Furthermore, authentication of a person may also be based on biometric features of the back of the hand determined from image data captured in visible light, in near infrared light, or a combination thereof. However, it is presently not known if biometric features of the back of the hand determined from image data captured with a visible light sensor sufficiently enable authentication of a person. In case of relying on the back of a hand, it is presently believed that image data captured with a near infrared light sensor are necessary for sufficiently enabling authentication of a person.

Figure 3:
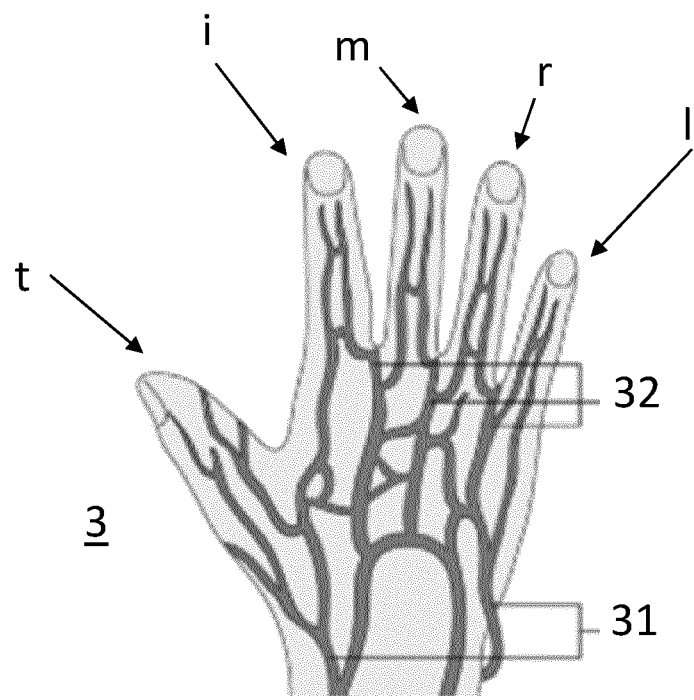
FIG. 3 illustrates schematically the venous network of the back of the right hand 3 of a third person.

FIG. 3 illustrates schematically the venous network of the back of the right hand 3 of a third person. The right hand 3 has a thumb t, an index finger i, a middle finger m, a ring finger r, and a little finger l. As illustrated in FIG. 3, the back of the hand 3 includes veins, which include the dorsal venous network 31 (*rete venosum dorsale manus*) and the dorsal metacarpal veins 32 (Vv. metacarpals dorsales). Vein patterns can be determined from image data captured with a near infrared light sensor, and individual biometric features can be determined form the image data captured in near infrared light.

Figure 4:
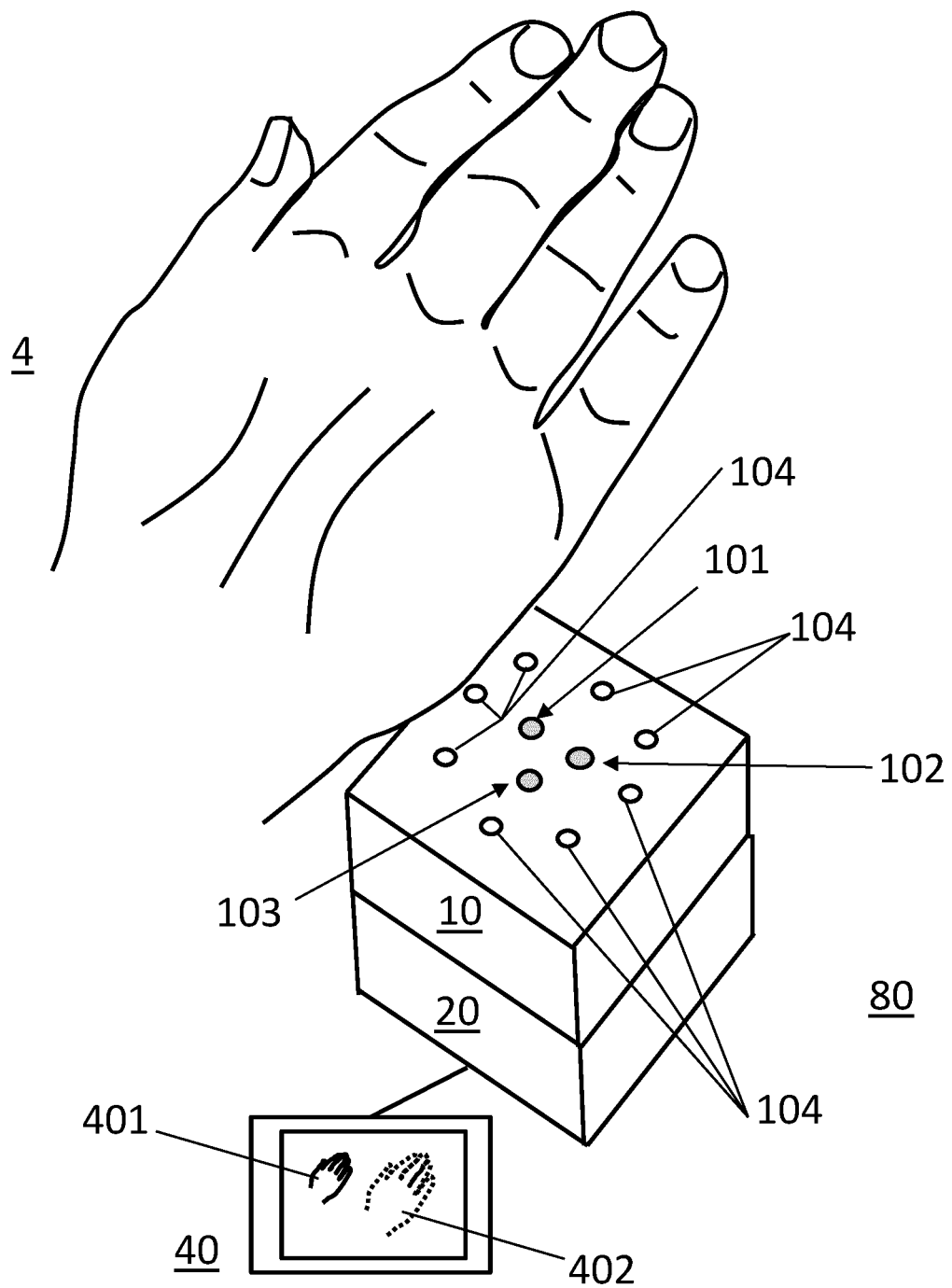
FIG. 4 illustrates schematically the hand of a person and a biometrics authentication device.

FIG. 4 illustrates schematically a biometrics imaging device 80, which may be part of or provide a biometrics authentication device. The biometrics imaging device 80 includes a biometric sensor 10 and a processing unit 20. The biometrics imaging device 80 may be connected to a user display 40, for example, for providing user guidance. The processing unit 20 may be attached to the biometric sensor 10 as illustrated in FIG. 4. The processing unit 20 may be located remotely within a computing infrastructure such as a host computer, server, cloud, etc. The processing unit 20 may include one or more processors and may have stored computer instructions which may be executed by the one or more processors in order to enable the functions as described in the present disclosure. The user display 40 may be fixedly installed close to the biometric sensor 10. The user display 40 may relate to a user device such as a notebook, smartphone, smartwatch, etc., wherein the processing unit 20 may communicate via a wireless connection such as Bluetooth with the user display 40, for example. The biometrics imaging device 80 may be included in a user device such as a notebook, smartphone, smartwatch, etc. As illustrated in FIG. 4, a current posture of the user's hand 401 and a desired posture of the user's hand 402 may be displayed on display 40.

The biometric sensor 10 enables capturing image data of the hand 4 of a person. The biometric sensor 10 includes a visible light sensor 101 for capturing image data in the visible light spectrum, a near infrared light sensor 102 for capturing image data in the near infrared light spectrum, and a time of flight camera 103 for capturing image data having three dimensions. One or more of the visible light sensor 101, the near infrared light sensor 102 and the time of flight camera 103 may be included into a single sensor. Furthermore, the biometric sensor 10 includes light sources 104. FIG. 4 illustrates eight light sources 104 arranged on a circle around the sensors 101, 102 and the time of flight camera 103. The light sources 104 may include a different number of light sources and/or may be arranged in a different manner. The light sources 104 may include customized lenses in order to achieve a homogeneous light distribution. The light sources 104 may include one or more light sources providing illumination in the visible light spectrum and enabling capturing image data with the visible light sensor 101 in the visible light spectrum. The light sources 104 may include one or more light sources providing illumination in the near infrared light and enabling capturing image data with the near infrared light sensor 102 in the near infrared light. Calibration may be provided in particular as regards the geometric location of the visible light sensor 101, the near infrared light sensor 102 and the time of flight camera 103, such as the translational displacement between the visible light sensor 101, the near infrared light sensor 102 and the time of flight camera 103. Moreover, calibration may be provided as regards a scaling factor of image data captured by the time of flight camera 103, such as the absolute size of objects in the captured image data. Calibration may be provided within the biometric sensor 10, by post-processing in a dedicated computer such as the processing unit 20, or a combination thereof. Calibration may provide that the objects in the image data captured by the visible light sensor 101, the near infrared light sensor 102 and the time of flight camera 103 align to each other.

The visible light sensor 101 may include a visible light sensitive chip providing 2D image data (2D: two dimensional) in accordance to a visible light intensity distribution generated by a 3D scene (3D: three dimensional). The near infrared light sensor 102 may include a near infrared light sensitive chip providing 2D image data (2D: two dimensional) in accordance to a near infrared light intensity distribution generated by a 3D scene (3D: three dimensional). The visible light sensor 101 and the near infrared light sensor 102 may include lenses, buffers, controllers, processing electronics, etc. The visible light sensor 101 and the near infrared light sensor 102 may relate to commercially available sensors such as e2v semiconductors SAS EV76C570 CMOS image sensor, equipped with a blocking optical filter <500 nm wavelength for the visible light sensor 101 and with a blocking optical filter of >700 nm for the near infrared light sensor 102, or such as OmniVision OV4686 RGB-Ir sensor, with the visible light sensor 101 and the near infrared light sensor 102 combined in one chip and having included a RGB-Ir filter). The light sources 104 may include a visible light and/or near infrared light generator such as an LED (LED: light emitting diode). The light sources 104 may relate to commercially available light sources such as high power LEDs SMB1N series from Roithner Laser Technik GmbH, Vienna.

Figure 5:
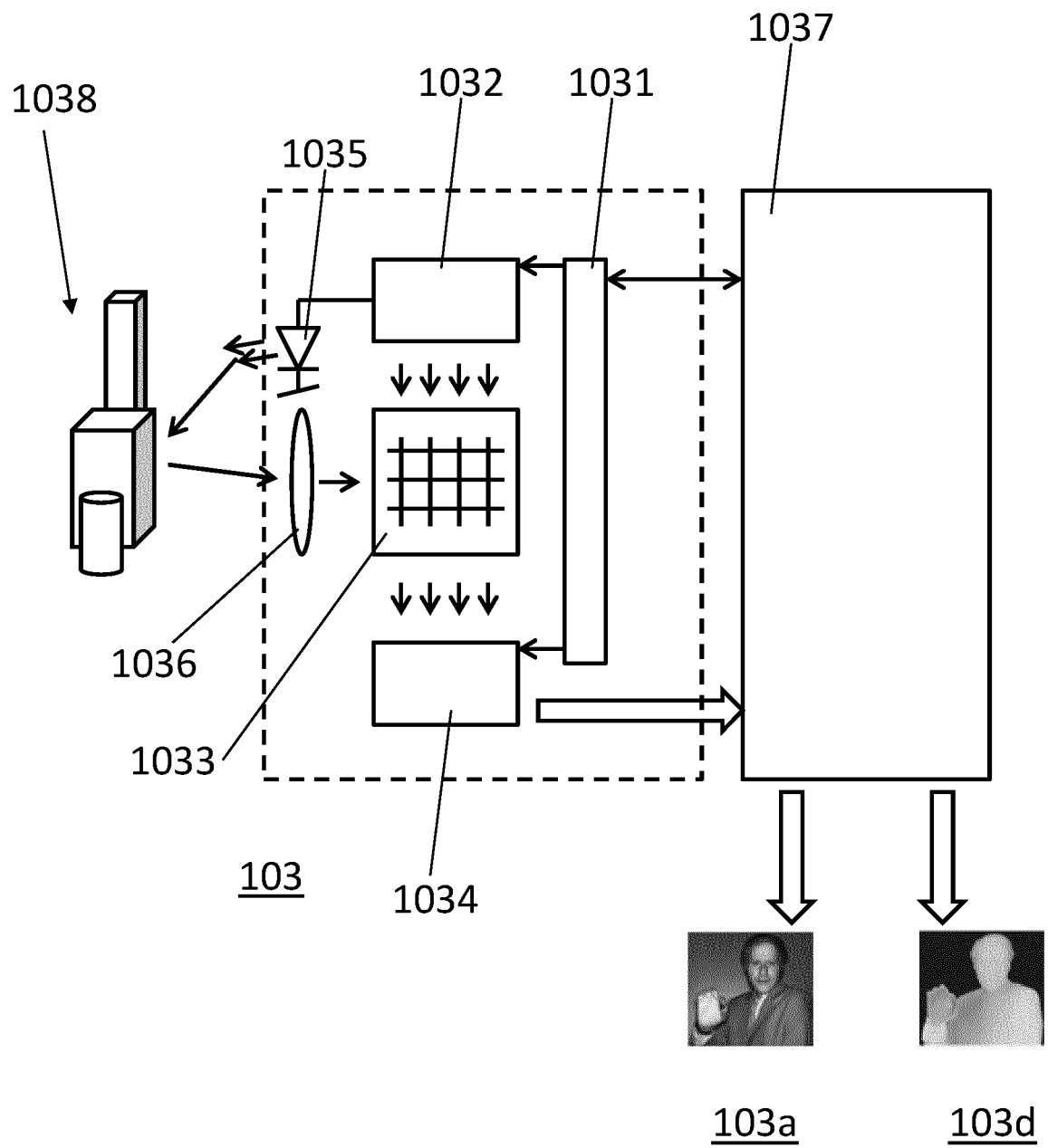
FIG. 5 illustrates schematically a time of flight camera.

FIG. 5 illustrates schematically a time of flight camera 103. The time of flight camera 103 includes a sequence controller 1031, a modulation controller 1032, a pixel matrix 1033, an A/D converter 1034 (A/D: analogue to digital), an LED or VCSEL 1035 (LED: light emitting diode; VCSEL: vertical-cavity surface-emitting laser), and a lens 1036. The sequence controller controls the modulation controller 1032 and the A/D converter 1034. The modulation controller 1032 controls the LED or VCSEL 1035 and the pixel matrix 1033. The pixel matrix 1033 provides signals to the A/D converter 1034. The sequence controller 1031 interacts with a host controller 1037, for example via 120 bus (12C: I-Squared-C serial data bus). The LED or VCSEL 1035 illuminates a 3D scene 1038. After a time of flight, the lens 1036 receives light reflected by the 3D scene 1038. The A/D converter 1034 provides raw 3D image data (3D: three dimensional) to the host controller 1037, for example via MIPI CSI-2 or PIF (MIPI: Mobile Industry Processor Interface; CSI: Camera Serial Interface; PIF: Parallel InterFace). The host controller performs a depth map calculation and provides an amplitude image 103*a* of the 3D scene 1038 and a depth image 103*d* of the 3D scene. As illustrated in FIG. 5, the background of the amplitude image 103*a* includes shades of light of a wall behind a person, for example, while the background of the depth image 103*d* has a single value, such as black, because the wall behind the person is arranged at a specific distance from the time of flight camera 103. The time of flight camera 103 may relate to a REAL3™ of the company Infineon™, and may include the specifications: direct measurement of depth and amplitude in every pixel; highest accuracy; lean computational load; active modulated infra-red light and patented Suppression of Background Illumination (SBI) circuitry in every pixel; full operation in any light condition: darkness and bright sunlight; monocular system architecture having no mechanical baseline; smallest size and high design flexibility; no limitation in close range operation; no special requirements on mechanical stability; no mechanical alignment and angle correction; no recalibration or risk of de-calibration due to drops, vibrations or thermal bending; easy and very fast once-in-a-lifetime calibration; cost efficient manufacturing.

Figure 6:
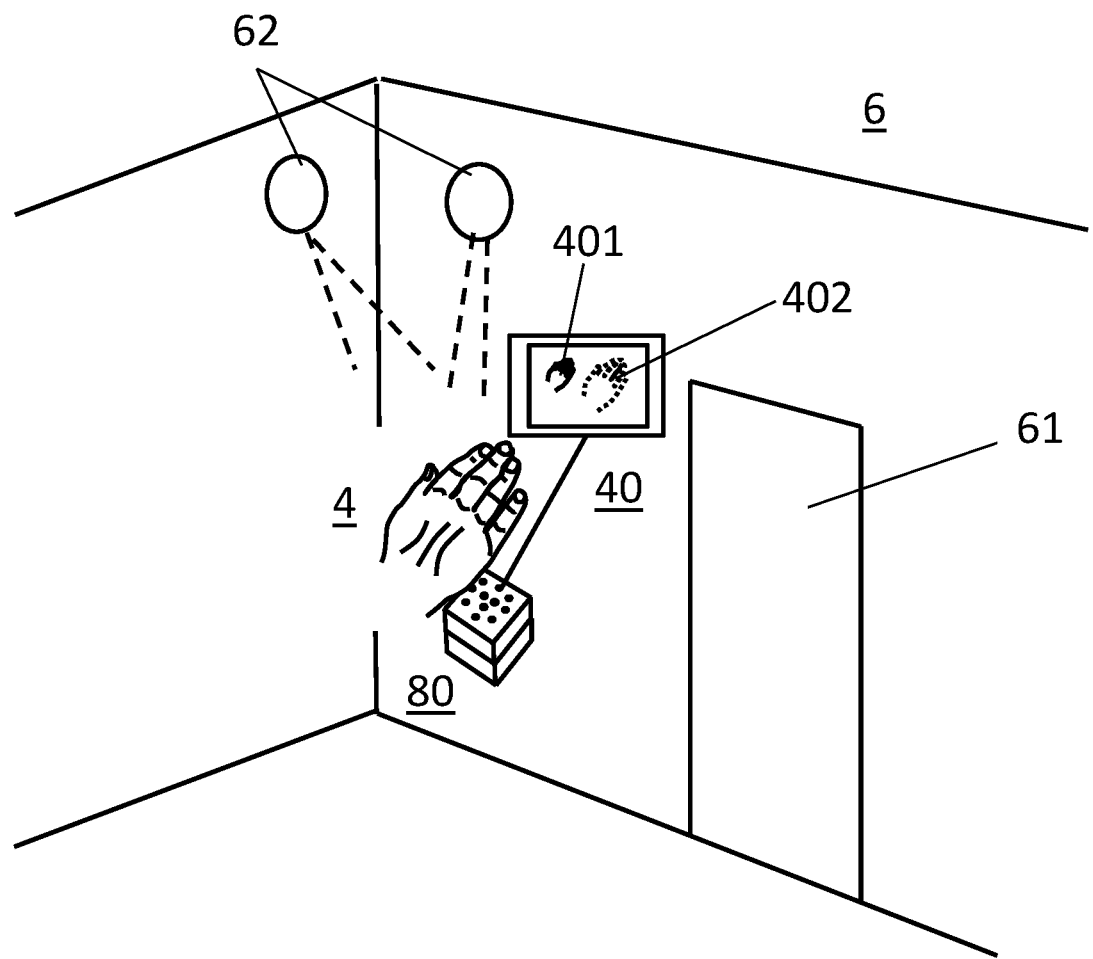
FIG. 6 illustrates schematically a biometrics imaging device installed in a building.

FIG. 6 illustrates schematically a biometrics imaging device 80 installed in a building 6 having an entrance 61. Access to the building 6 is controlled by a biometrics authentication device, which includes a biometrics imaging device 80. As illustrated in FIG. 6, the biometrics imaging device 80 is installed at a location close to the entrance 61. The biometrics imaging device 80 is configured to capture image data from a body part such as a hand 4 of a person requesting access to the building 6. Backlight, such as effected by light sources 62 installed for the purpose of providing comfortable lighting conditions, may severely deteriorate quality of the image data captured by the biometrics imaging device 80.

In order to capture image data with improved quality, the biometrics imaging device 80 is configured to execute an imaging procedure which includes the steps of: capturing three dimensional image data of a current posture of the hand 4; determining on the basis of the three dimensional image data a difference between a desired posture of the hand 4 and the current posture of the hand 4; providing on the basis of the determined difference user guidance 401, 402 to the person enabling the person to adapt the posture of the hand 4 in direction of the desired posture; and capturing at least one of image data in the visible light spectrum and image data in the infrared light spectrum of the hand 4.

FIGS. 7*a*, 7*b*, 7*c*, 7*d* illustrate schematically user guidance relating to an imaging procedure executed by the biometrics imaging device 80. User guidance is displayed on a display 40. The display 40 may be fixedly installed at a location close to the biometrics device 80. The display 40 may relate to a user device such as a tablet computer, a smartphone, etc.

Figure 7A:
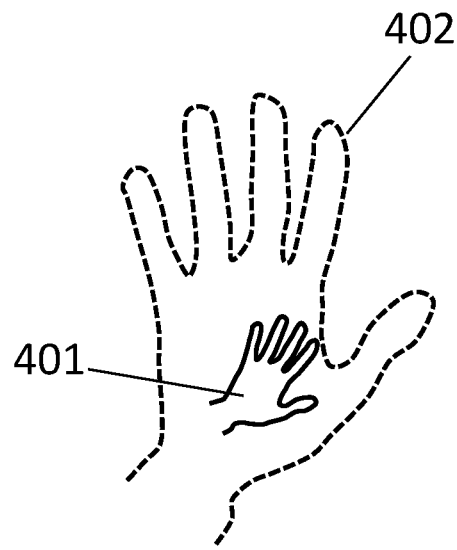
FIG. 7a, 7b, 7c, 7d illustrate schematically user guidance relating to an imaging procedure executed by the biometrics imaging device.

As illustrated in FIG. 7*a*, a representation of a desired posture 402 of the hand 4 is displayed. Displaying the representation of the desired posture 402 is based on three dimensional image data captured with the time of flight camera 103 and may be calibrated in accordance to the hand 4. Calibration in accordance to the hand 4 is important for enabling proper guidance of hands of different sizes, such as a hand of a man, of a woman, or of a child. As illustrated in FIG. 7*a*, a representation of the current posture 402 of the hand 4 is displayed. Displaying the representation of the current posture 401 is based on three dimensional image data captured with the time of flight camera 103.

In the example according to FIG. 7a, the current posture of the hand 4 is too far away from the biometrics imaging device 80, which is indicated by displaying the representation of the current posture 401 at a smaller size than the representation of the desired posture 402. Accordingly, the person is enabled to adapt the posture of the hand 4 in direction of the desired posture, namely to move the hand closer to the biometrics imaging device 80.

Figure 7B:
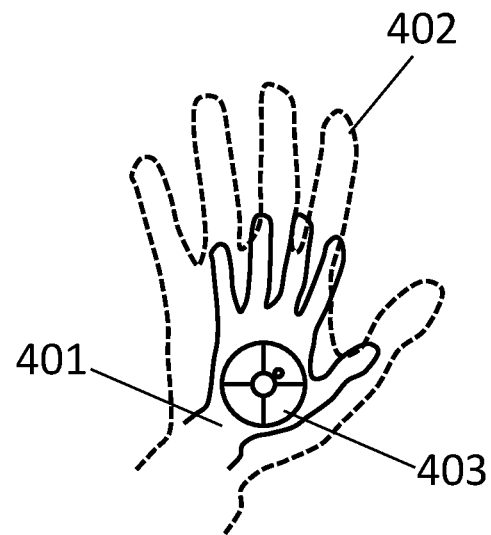

In the example according to FIG. 7b, the current posture of the hand 4 is still too far away from the biometrics imaging device 80, which is indicated with displaying the representation of the current posture 401 at a smaller size than the representation of the desired posture 402. However, with regard to the example according to FIG. 7a, the distance is reduced and further information may be displayed such as a spirit level 403 in order to provide further guidance to adapt the posture of the hand 4. The spirit level 403, which is displayed on the back of the representation of the hand at the current posture 401, provides user guidance as regards a difference between the current inclination of the hand and the desired inclination of the hand. Accordingly, the person is enabled to adapt the posture of the hand 4 in direction of the desired posture, namely to move the hand even closer to the biometrics imaging device 80 and to adapt inclination of the hand.

Figure 7C:
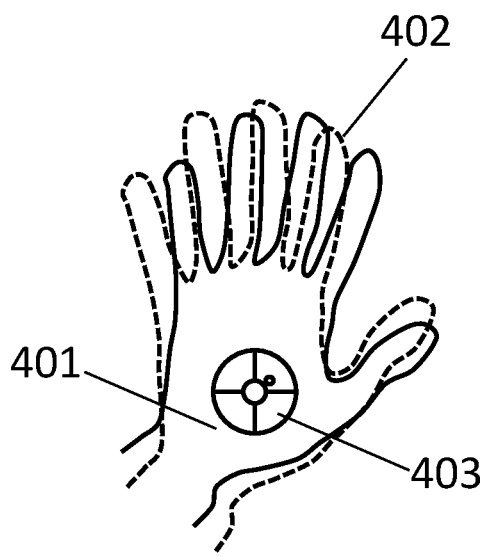

In the example according to FIG. 7c, the current posture of the hand 4 is approximately at the desired distance from the biometrics imaging device 80, which is indicated with displaying the representation of current posture 401 at approximately the same size as the representation of the desired posture 402. However, the posture of the hand 4 does not have yet the correct inclination, which is indicated by the spirit level 403 displayed together with the representation of the hand at the current posture 401. Accordingly, the person is enabled to adapt the posture of the hand 4 in direction of the desired posture, namely to adapt inclination of the hand even more.

Figure 7D:
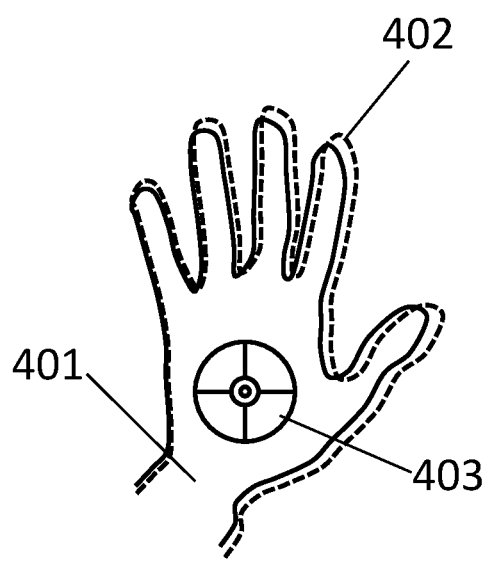

In the example according to FIG. 7d, the difference between the current posture of the hand 4 and the desired posture of the hand 4 is at a sufficiently small level. The biometrics imaging device 80 captures at least one of image data in the visible light spectrum and image data in the infrared light spectrum. Because the posture of the hand 4 is in conformance with a desired posture, which may in particular take into account backlight conditions, optimal focus conditions, etc., captured image data has improved quality.

Figure 8:
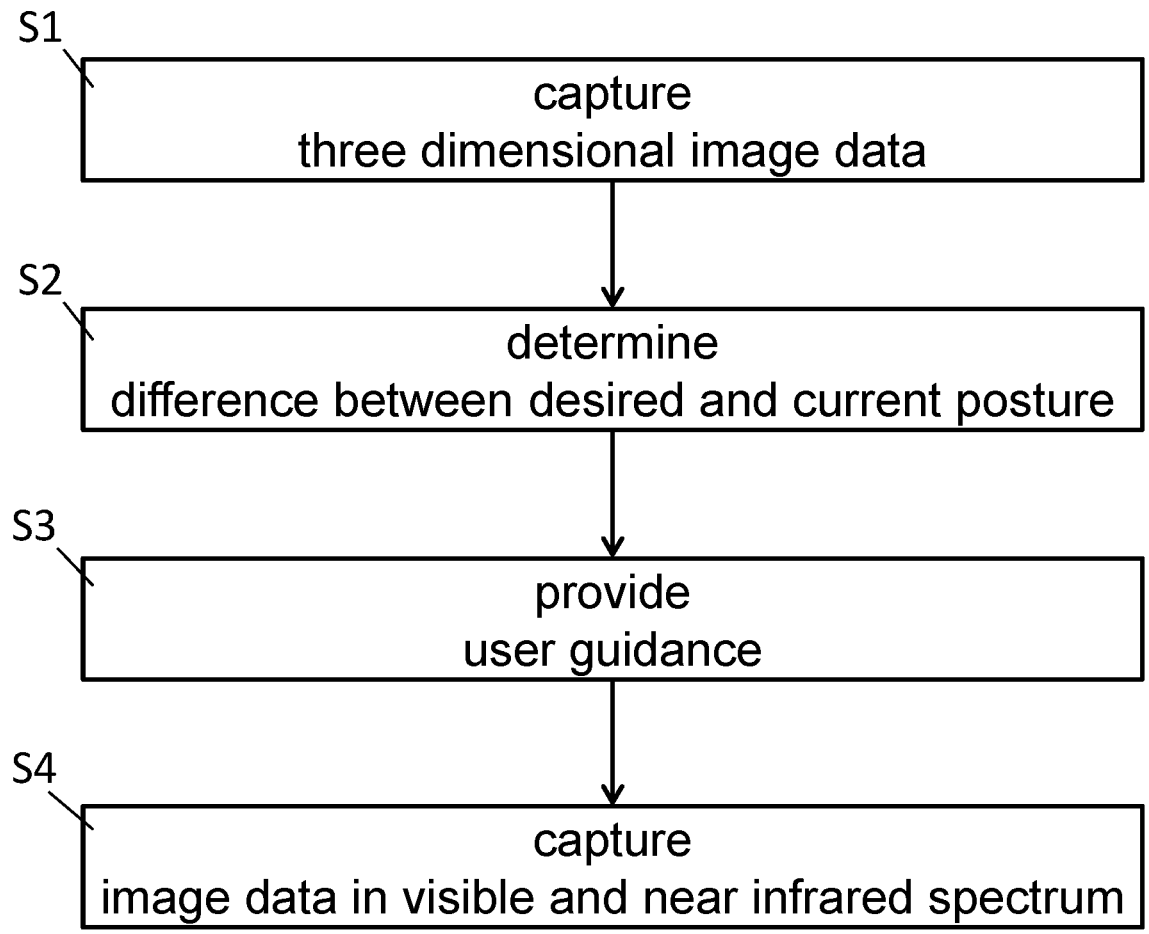
FIG. 8 illustrates schematically a method of capturing image data of a hand of a user.

FIG. 8 illustrates schematically a method of capturing image data of a hand 4 of a person. The method includes an imaging procedure which the following steps. In step S1, captured is three dimensional image data of a current posture of the hand 4 using a time of flight camera 103. In step S2, determined is on the basis of the three dimensional image data a difference between a desired posture of the hand 4 and the current posture of the hand 4. In step S3, provided is on the basis of the determined difference user guidance 401, 402 to the person enabling the person to adapt the posture of the hand 4 in direction of the desired posture. In step S4, captured is at least one of image data in the visible light spectrum and image data in the infrared light spectrum of the hand 4. For example, steps S1 to S3 are repeated continuously until in step S2 it is determined that the difference is smaller than a predefined threshold and step S2 is followed by step S4.

REFERENCE SIGNS 1, 2, 3 hand of first, second and third person
t, i, m, r, l thumb finger, index finger, middle finger, ring finger, little finger
P palm print or lifelines
31, 32 dorsal venous network, dorsal metacarpal veins
4 hand of a person
10 biometric sensor
101 visible light sensor
102 near infrared light sensor
103 time of flight camera
104 light sources
20 processing unit
80 biometrics imaging device
40 display
401, 402 current posture of user's hand, desired posture of user's hand
403 spirit level

The invention claimed is:

1. A biometrics imaging device for capturing image data of a body part of a person, the biometrics imaging device comprising at least one of a visible light sensor configured for capturing image data of the body part in a visible light spectrum and a near infrared light sensor configured for capturing image data of the body part in a near infrared light spectrum, wherein:
   the biometrics imaging device includes a time-of-flight camera configured for capturing three dimensional image data of the body part of the person; and
   the biometrics imaging device is configured to execute an imaging procedure which includes:
   capturing three dimensional image data of a current body part posture;
   determining, based on the three dimensional image data, a difference between a desired body part posture and the current body part posture;
   providing, based on the determined difference, user guidance to a person enabling the person to adapt a body part posture in a direction of the desired body part posture; and
   capturing at least one of image data in the visible light spectrum and image data in the infrared light spectrum; and
   wherein when the determined difference is within a predefined range, the biometrics imaging device is configured to maintain a delay of less than 100 milliseconds between determining the difference and capturing at least one of image data in the visible light spectrum and image data in the infrared light spectrum.

2. The biometrics imaging device of claim 1, wherein the current body part posture and the desired body part posture relate to one or more of a relative distance, a relative orientation, and a gesture.

3. The biometrics imaging device of claim 1, wherein the user guidance relates to one or more of adapting a relative distance, a relative orientation, and a gesture of the current body part posture.

4. The biometrics imaging device of claim 1, wherein the user guidance includes one or both of a visual guidance displayed on a display and an acoustic guidance played back on a loudspeaker.

5. The biometrics imaging device of claim 1, wherein the user guidance includes displaying on a display a representation of the desired body part posture and a representation of the current body part posture.

6. The biometrics imaging device of claim 1, wherein the user guidance includes displaying on a display a representation of a spirit level indicating the difference between the current body part posture and the desired body part posture.

7. The biometrics imaging device of claim 1, further configured to repeat one or more steps of the imaging procedure more than once.

8. The biometrics imaging device of claim 1, further configured to determine a region of interest of the body part based on at least one of three dimensional image data, image data in the visible light spectrum and image data in the near infrared light spectrum, and to adapt, in accordance to the region of interest, at least one of the desired body part posture and capturing at least one of image data in the visible light spectrum and image data in the infrared light spectrum.

9. A biometrics imaging method for capturing image data of a body part of a person, wherein at least one of a visible light sensor configured for capturing image data of the body part in a visible light spectrum and a near infrared light sensor configured for capturing image data of the body part in a near infrared light spectrum is provided, the method comprising:
   providing a time-of-flight camera configured for capturing three dimensional image data of the body part of the person; and
   executing an imaging procedure which includes capturing three dimensional image data of a current body part posture;
   determining, based on the three dimensional image data, a difference between a desired body part posture and the current body part posture;
   providing, based on the determined difference, user guidance to a person enabling the person to adapt a body part posture in a direction of the desired body part posture; and
   capturing at least one of image data in the visible light spectrum and image data in the infrared light spectrum; and
   the biometrics image method further comprises, if the determined difference is within a predefined range, maintaining a delay of less than 100 milliseconds between determining the difference and capturing at least one of image data in the visible light spectrum and image data in the infrared light spectrum.

10. The biometrics imaging method of claim 9, wherein the user guidance relates to one or more of adapting a relative distance, a relative orientation, and a gesture of the current body part posture.

11. The biometrics imaging method of claim 9, wherein the user guidance includes displaying on a display a representation of the desired body part posture and a representation of the current body part posture.

12. The biometrics imaging method of claim 9, further comprising repeating one or more steps of the imaging procedure more than once.

13. The biometrics imaging method of claim 9, further comprising determining a region of interest of the body part based on at least one of three dimensional image data, image data in the visible light spectrum and image data in the near infrared light spectrum, and adapting in accordance to the region of interest at least one of the desired body part posture and capturing at least one of image data in the visible light spectrum and image data in the infrared light spectrum.

14. The biometrics imaging device of claim 1, wherein the delay is less than 10 milliseconds.

15. The biometrics imaging method of claim 9, wherein the delay is less than 10 milliseconds.

* * * * *